United States Patent [19]

Wada et al.

[11] Patent Number: 4,648,622
[45] Date of Patent: Mar. 10, 1987

[54] SUSPENSION DEVICE FOR AUTOMOBILE

[75] Inventors: Shunichi Wada; Setsuhiro Shimomura, both of Himeji; Naotake Kumagai, Aichi; Shozo Takizawa, Okazaki; Mitsunori Maruyama, Okazaki; Minoru Tatemoto, Okazaki; Hiroyuki Takada, Okazaki; Mitsuhiko Harara, Okazaki, all of Japan

[73] Assignees: Mitsubishi Denki Kabushiki Kaisha; Mitsubishi Jidosha Kogyo Kabushiki Kaisha, both of Tokyo, Japan

[21] Appl. No.: 873,160

[22] Filed: Jun. 10, 1986

Related U.S. Application Data

[63] Continuation of Ser. No. 643,539, Aug. 23, 1984, abandoned.

[30] Foreign Application Priority Data

Aug. 24, 1983 [JP] Japan ................. 58-155600

[51] Int. Cl.$^4$ ............................................. B60G 17/04
[52] U.S. Cl. ................................. 280/707; 267/64.16
[58] Field of Search ................. 280/705, 707, 714; 180/41; 267/64.16, 64.25; 364/424

[56] References Cited

U.S. PATENT DOCUMENTS

| | | | |
|---|---|---|---|
| 3,995,883 | 12/1976 | Glaze | 280/707 |
| 4,065,154 | 12/1977 | Glaze | 280/707 |
| 4,185,845 | 1/1980 | Misch et al. | 280/707 |
| 4,373,744 | 2/1983 | Glaze | 280/707 |
| 4,402,527 | 9/1983 | Kakehi et al. | 280/707 |
| 4,466,625 | 8/1984 | Kondo et al. | 267/64.16 |
| 4,468,739 | 8/1984 | Woods et al. | 280/714 |

FOREIGN PATENT DOCUMENTS

| | | |
|---|---|---|
| 48867 | 3/1980 | Australia . |
| 61232 | 3/1981 | Australia . |
| 2716476 | 10/1978 | Fed. Rep. of Germany . |
| 2362017 | 8/1977 | France . |
| 2467720 | 10/1980 | France . |
| 2084762 | 8/1981 | United Kingdom . |

OTHER PUBLICATIONS

Patent Abstracts of Japan vol. 7, No. 217, Sep. 27th, 1983, (M-245) (1362); & JP-A-58-112819 (Nippon Denso) 05-07-83.
IEF 181 Automotive Electronics Oct. 29-Nov. 2, 1979; "Electronic Concepts for Suspension Systems".

Primary Examiner—John J. Love
Assistant Examiner—Ross Weaver
Attorney, Agent, or Firm—Oblon, Fisher, Spivak, McClelland & Maier

[57] ABSTRACT

A suspension device for automobile performs changing-over of the damping force of a shock absorber and the spring constant of a suspension spring by an output from an acceleration sensor or an output from a road clearance sensor mounted on the vehicle body. The changing operation is not performed by magnitude of an output but is performed only when an output greater that a predetermined level continues for a predetermined time period to avoid unnecessary change-over operations of the suspension characteristic during cruising a rough road.

5 Claims, 14 Drawing Figures

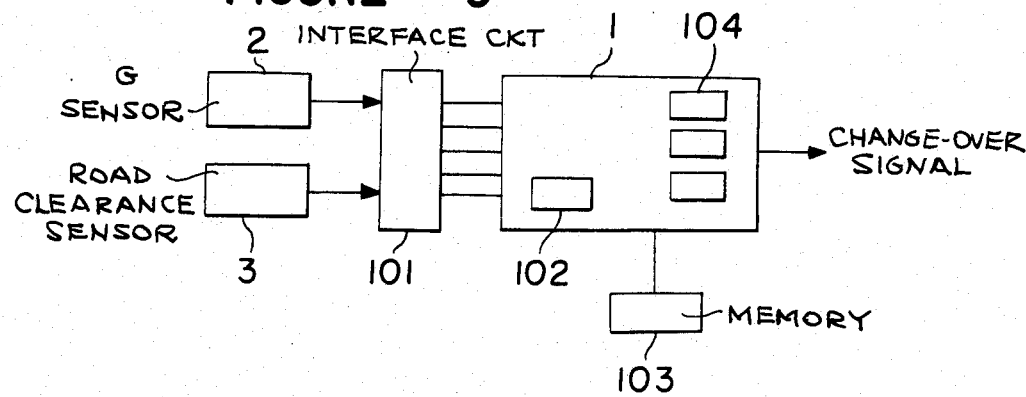
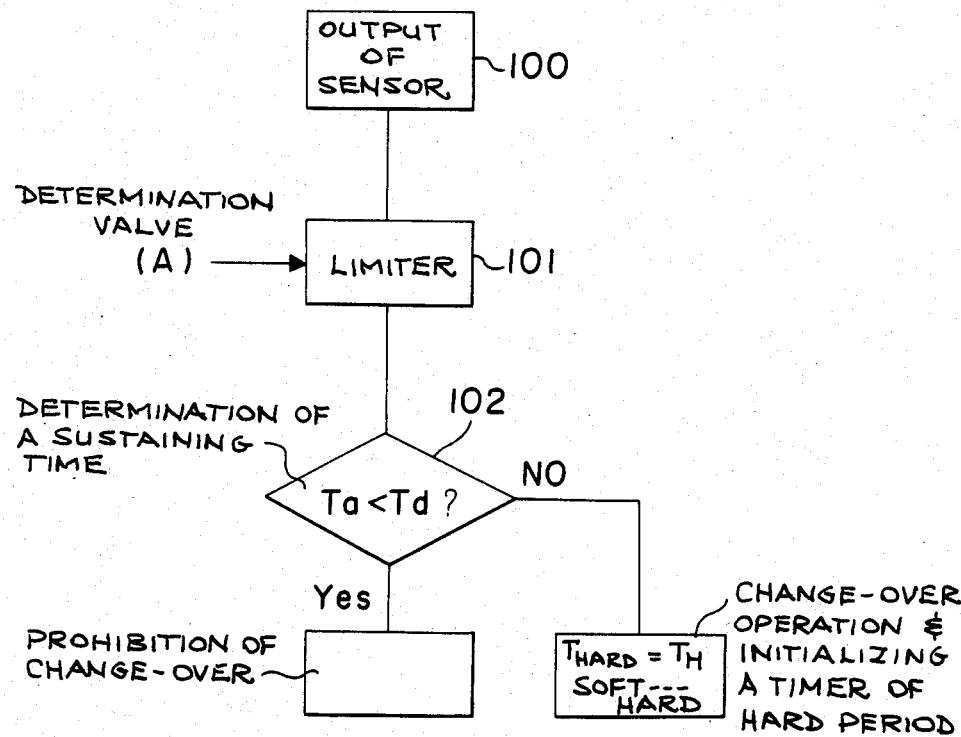

SUSPENSION DEVICE FOR AUTOMOBILE

This application is a continuation of application Ser. No. 643,539 filed Aug. 23, 1984, now abandoned.

BACKGROUND OF THE INVENTION

1. Field of the Invention

This invention relates to a suspension device for automobile. More particularly, it relates to a suspension device for automobile in which a damping force of a shock absorber and spring constant of a suspension spring for the suspension device are changed over depending on vibratory motion in the vehicle body.

2. Discussion of Background

It has so far been known that, for the sake of comfortableness in vehicle riding, the damping force required for the purpose should preferably be as small as possible and the spring constant be as small as possible (i.e., soft spring mode), and that, for the sake of steering stability, the damping force required for the purpose should preferably be as large as possible and the spring constant be as large as possible (i.e., hard spring mode). For meeting such requirements, there has been proposed a change-over system of a type such that, in an ordinary cruising condition of the automobile, the damping force of the shock absorber and the spring constant of the suspension spring may be set at small values, and, depending on necessity, both damping force and spring constant may be changed over to large values, or hard spring mode.

As means for detecting whether it is necessary to perform the change-over operations, or not, consideration will now be given to a case, wherein measurement is taken on vibratory acceleration or changes in road clearance of the vehicle body with respect to the ground surface due to its vibratory motion, or changing speed of such changes in the road clearance, from which results the change-over operations are performed.

Vibrations which the vehicle tires pick up from the ground surface are determined by the vehicle cruising speed and the surface conditions of the road. Of the vibrations, the high frequency vibrating components having very small amplitude have to be absorbed by the tires and dampers, hence the suspension spring of the vehicle body should also be made soft. On the contrary, when a large force is imparted to the vehicle body owing to operations of the steering handle or the brake, the vibratory acceleration and the amplitude are large, even though the period of vibrations is long. In such case, the change-over operations should be done in such a manner that the damping force and the spring constant are set at large values so as to suppress variations in posture of the automobile.

Simple determination of whether such change-over operations be done, or not, on the basis of the vibratory acceleration (G), or magnitude of variations and the road clearane, or their changing speed alone would cause such disadvantage that, in the case of, for example, running on a rough road, both damping force and spring constant are changed over to large values (hard spring mode) owing to the vibratory acceleration (G) to be generated by irregularities on the road surface with the consequent worsening in the ride. A further disadvantage derived from such simple determination is that, when both damping force and spring constant are changed over to large values (hard spring mode), larger vibratory motion occurs in the vehicle body running on the rough road and the vibrations assume high frequency, on account of which the vehicle body is unable to restitute its required comfort.

SUMMARY OF THE INVENTION

Accordingly, one object of this invention is to provide a system for which measurement is taken during a sustaining time period, during which the vibratory acceleration assumes a predetermined value or higher; the change-over operation of the damping force and the spring constant are performed only when the vibratory acceleration is detected over a predetermined time or longer; and no change-over operations of the damping force and the spring constant are performed even on a rough road of such an extent that driving stability of the vehicle is not impaired thereby, thus making it possible to maintain desired comfortableness in the vehicle riding.

The foregoing and the other objects of the present invention have been attained by providing a suspension device for automobile comprising a shock absorber provided with a damping force change-over mechanism, a self-suspension spring provided with a spring constant change-over mechanism, a sensor for detecting vibrations of the vehicle body and a control device which detects a sustaining time period of an output of the sensor exceeding a determination value and outputs a change-over signal only when the sustaining time period continues for a predetermined time period whereby the damping force of the shock absorber is changed over to a high value, or the spring constant of the spring is changed over to a large value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 is a schematic diagram of an embodiment of the control device of the present invention; and FIG. 10 is a flow chart for explaining the operations of the suspension device according to the present invention.

DESCRIPTION OF THE PREFERRED EMBODIMENT

Figure 1:
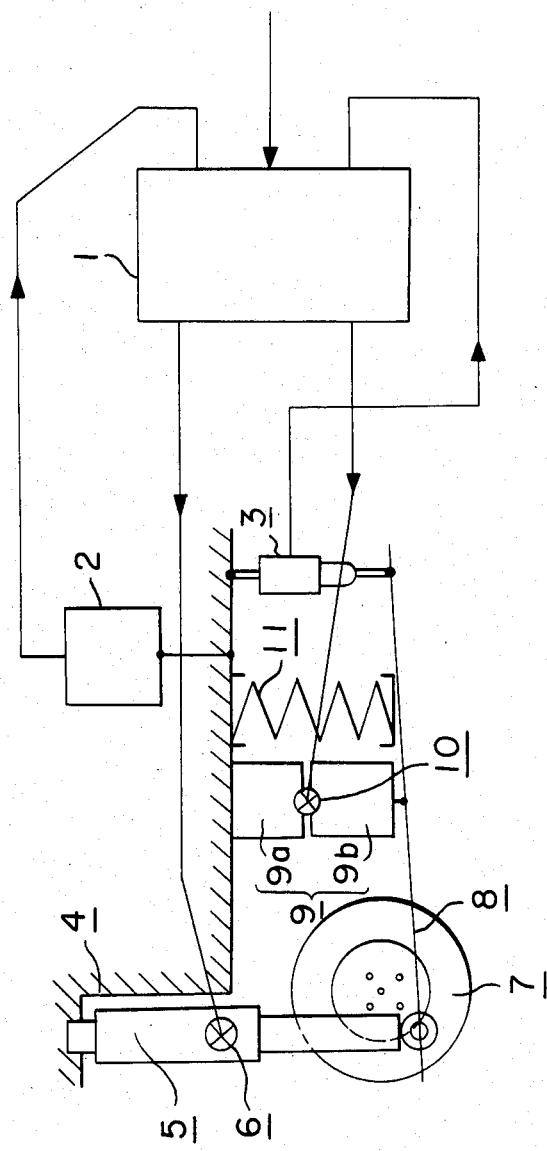
FIG. 1 is a structural diagram of an embodiment of the suspension device of the present invention.

Referring now to the drawings, wherein like reference numerals designate identical or corresponding parts throughout the several views, and more particularly to FIG. 1 thereof, there is illustrated a schematic diagram showing a construction of the automobile suspension device according to one embodiment of the present invention. In the drawing, a reference numeral 1 designates a control unit comprising a micro-computer which performs opening and closing of a variable orifice 6 in a shock absorber 5 as well as a connecting path 10 of an air spring 9 in accordance with input information from the acceleration sensor (G sensor) 2, the road clearance sensor 3, and others. A numeral 4 refers to the vehicle body, a numeral 7 refers to wheels, 8 indicates an arm, 9 represents the air spring which consists of a chamber A (9a) and a chamber B (9b), both chambers 9a, 9b being communicatively connected when the connecting path 10 is opened to thereby reduce the spring constant to render the spring in its soft spring mode. On the contrary, when the connecting path 10 is closed, the spring constant is increased to render the spring in its hard spring mode. A reference numeral 11 denotes an auxiliary spring. When the orifice diameter of an oil passageway in the shock abosrber 5 is changed by the actuator 6 over to a large diameter, the damping factor becomes small, and, on the contrary, when the orifice diameter of the oil passageway is changed over to small diameter, the damping factor is changed to a large diameter.

The constructions of the acceleration sensor 2 and the road clearance sensor 3 will be described.

Figure 2:
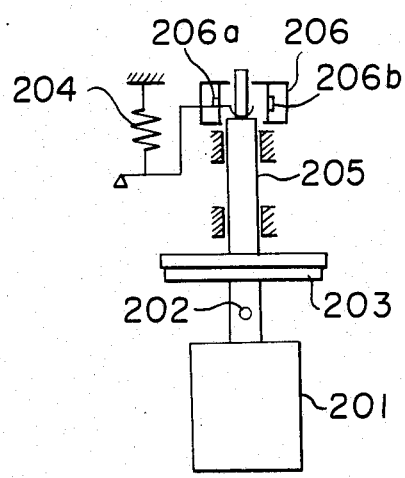
FIGS. 2 and 3 are diagrams showing a construction and operations of an acceleration sensor.
Figure 3:
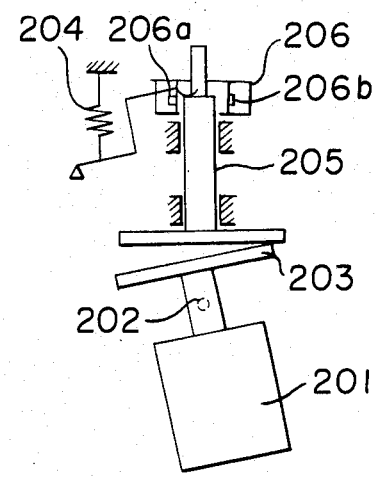

The acceleration sensor 2 has a weight 201 supported by a supporting point 202, above which a push-up plate 203 is kept at a horizontal position as shown in FIG. 2. There is provided above the push-up plate 203 a spring 24 which urges downwardly with a predetermined force the push-up plate through a vertically movable rod 205. When acceleration in the horizontal direction acts on the weight 201, there takes place inclination of the weight 201 as shown in FIG. 3 to push up the push-up plate 203 through the rod 205, whereby light of a photo-interrupter 206 consisting of a light emitting element 206a and a light receiving element 206b is interrupted. With the construction of the acceleration sensor 2, it is obtainable whether or not acceleration having a predetermined value or higher acts on the sensor.

Figure 4:
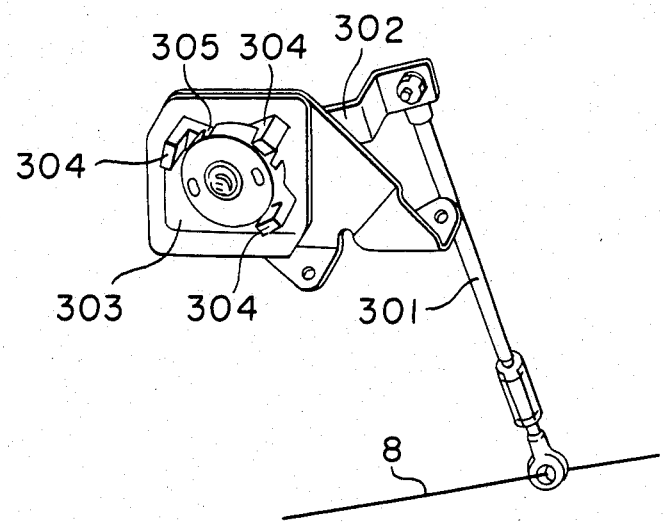
FIG. 4 is a perspective view showing a construction of a sensor for detecting a road clearance of a vehicle body.

FIG. 4 shows the road clearance sensor 3 comprising a rod 301 linked to the arm 8, a lever 302, a disc plate 303 which is turnable depending on the movement of the lever 302 and three photo-interrupters 304. Slits 305 are formed in the disc plate 303. When change in the road clearance occurs, the disc plate 303 is turned through the arm 8, the rod 301 and the lever 302 thereby turning on the photo-interrupter 304 with the consequence that the change in the road clearance can be detected.

Although, in FIG. 1, only one wheel is illustrated as being representative of the four wheels, it should be understood that the remaining wheels (not shown in the drawing) are of the same construction as that shown in the drawing.

Figure 5:
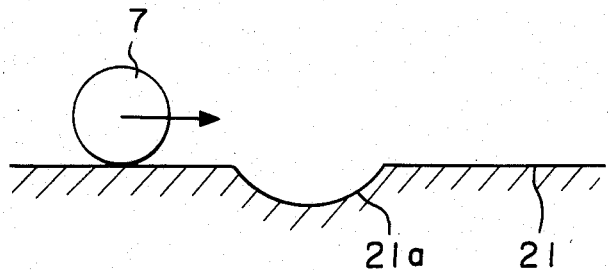
FIG. 5 is a schematic diagram showing the surface condition of a road.
Figure 6A:
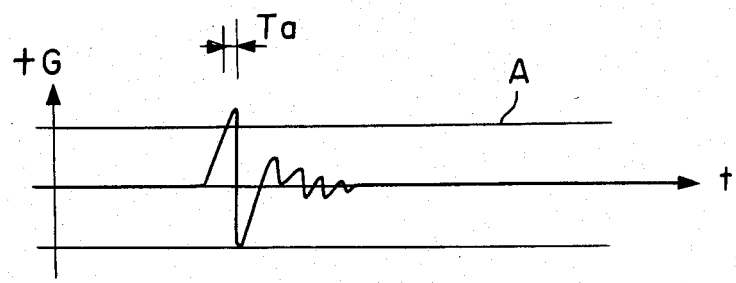
FIGS. 6A, 6B and 6C are respectively graphical representations showing the operating waveformes of the vibratory acceleration sensor (G sensor) corresponding to the condition as shown in FIG. 5.
Figure 6B:
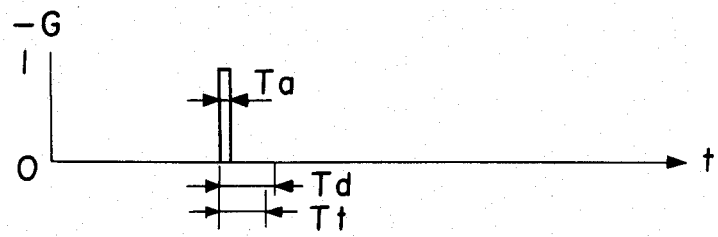

When considering a case, in which the automobile passes over a hollow cavity 21 in the road surface as shown in FIG. 5, there can be obserbed vibrations in the vehicle body 4 to be determined by the vehicle speed, the conditions of the road surface, and the characteristics of the suspension device. The vibrations in the vehicle body are detected by the road clearance sensor 3 and the acceleration sensor (G sensor) 2, both of which are directly attached onto the vehicle body 4. If the width and length of the hollow cavity 21a in this road surface is taken as, for example, 50 cm and the vehicle speed is taken at 50 km/h, a time Tt required for the vehicle to pass over this hollow cavity 21a is calculated as 36 ms. When the vibratory acceleration (G) of the vehicle body 4 at this time is detected, there can be obtained an output as shown in FIG. 6A, in case the acceleration sensor (G sensor) 2 producing an analog output is used, while there can be obtained an output as shown in FIG. 6B, in case the acceleration sensor (G sensor) 2 of a type which produces an output "1" when the acceleration G higher than the predetermined value A is present. Such vibrations should be primarily absorbed by the tires and the suspension device, and the damping force and the spring constant should preferably be small, hence the spring should desirably have the soft spring mode. However, the vibrations in the vehicle body, while it is passing over the road surface with such hollow cavity therein, are of high frequency, even though the amplitude thereof is small, hence the vehicle speed and the acceleration take large values. In addition, even when the amplitude is large, the sustaining time is usually short. On account of this, the determination for the change-over operations of the damping force and the spring constant on the basis of the absolute value of the acceleration (G) alone, or the absolute value of the amplitude of the vibrations alone, or the absolute value of the vibration speed alone would lead to apprehension such that the change-over operations might take place even when the vehicle is running over the rough road as shown in FIG. 5 where no change-over operations are actually required.

Figure 6C:
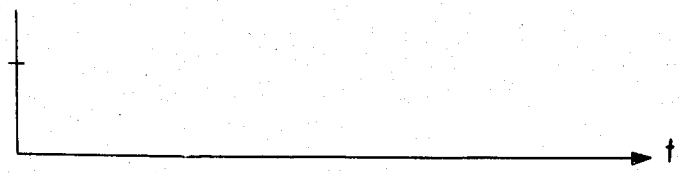
Figure 7:
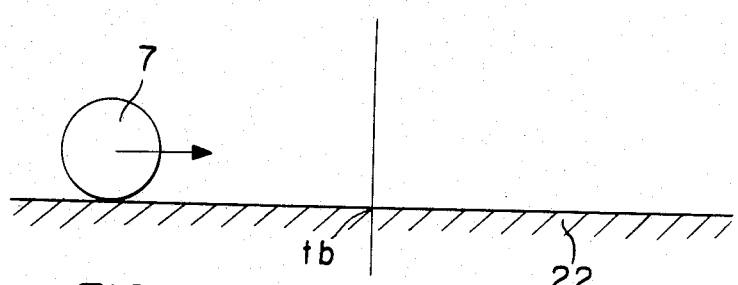
FIG. 7 is a schematic diagram showing a position, at which a brake is applied to wheels.

Accordingly, if the abovementioned change-over operations will be performed by determining not only the abovementioned absolute values, but also the sustaining time Ta thereof, and only when both values satisfy the determination value at the same time, the change-over operations become able to be prohibited when the vehicle is passing over the rough road as shown in FIG. 5. Such determination can be easily realized by use of a micro-computer and an interface circuit therefor in the control unit 1, and by adequately programming the above-mentioned determination method. For instance, in the case of FIG. 5, if the determination value Td of the sustaining time is set at 40 ms which is a value greater than a time Tt=36 ms which is required for the vehicle to pass over the hollow cavity 21a, the change-over operations can be prohibited without failure because Ta becomes smaller than Td. FIG. 6C shows that no change-over operation is made from soft mode to hard mode. In other words, as the G sensor 2, use is made of one which produces a pulse signal output at a value higher than a predetermined value of acceleration G, for example, 0.5 G or higher, then this output pulse signal is introduced as an input into an input terminal of the micro-computer 1, and a time width of this pulse signal input is determined by a clock within the micro-computer, on the basis of which determination an output is produced when the time width is broader than the predetermined sustaining time.

Further detailed description will be made with reference to FIG. 9, the data of 40 ms stored in a memory 103 is input in a register 104 in the micro-computer 1 to set a level of 40 ms. Then, an output of the G sensor 2 is input to the micro-computer 1 through an interface circuit 101. The input signal is subjected to determination by a clock signal from a clock signal producer 102 provided in the micro-computer 1 and a change-over signal is output only when the output of the G sensor 2 has its sustaining time longer than the data 40 ms stored in the register 104 whereby the spring constant is changed from soft mode to hard mode.

Figure 8A:
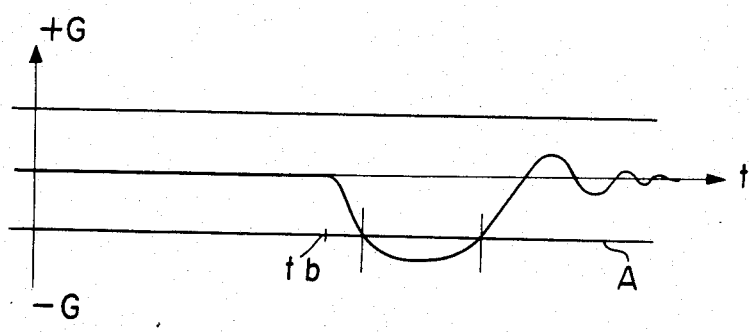
FIGS. 8A, 8B and 8C are respectively graphical representations showing the operating waveforms, under the condition shown in FIG. 7 of the vibratory acceleration sensor (G sensor) according to one embodiment of the present invention.
Figure 8B:
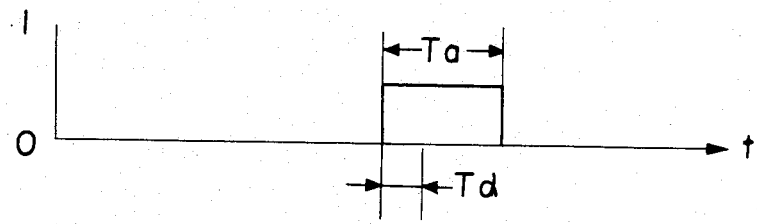
Figure 8C:
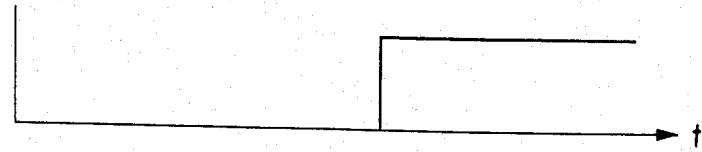

In the next place, consideration is given as to an instance wherein the vehicle brings about abrupt change in its posture on a flat and smooth road 22 as shown in FIG. 2 owing to operations of the steering handle and the brake. In this case, as being different from that shown in FIG. 6, the vibrations in the vehicle body and the changing speed of the road clearance are 1/5 to 1/10 times as slow as the abovementioned changing speed, whereby there can be observed a large value of acceleration G having a relatively long sustaining time, large changes in the road clearance, and so forth, as shown in FIG. 8A. A reference letter tb denotes a time instant when the braking action is applied to the wheels, and a reference letter A designates determination level. Yet, in this case, it is necessary that the damping force of the shock absorber and the spring constant of the spring be quickly changed over to larger values, hence a hard spring mode. The change-over operations can also be determined easily, as mentioned in the foregoing, once the sustaining time of the large variations in and the changing speed of the acceleration (G) and the road clearance is determined. For example, the change-over operations may be done only when the sustaining time of Td=40 ms or longer is satisfied, and the acceleration, the changes in the road clearance, and the changing speed of the road clearance are at their predetermined absolute values. FIG. 8B indicates an output when the absolute value of the sensor output shown in FIG. 8A exceeds the determination value A, the period Ta' being longer than the determination time Td. FIG. 8C indicates a state, wherein an output which has exceeded the determination value A is verified to have lasted longer than the determination time Td, and the spring constant is changed from the soft mode over to the hard mode.

FIG. 10 is a flow chart for explaining the operations of the automibile suspension device according to the present invention. The flow chart illustrates a state of whether the change-over operations be effected or prohibited by performing determination of the sustaining time in a step 102 with an output 100 from the G sensor 2 or the road clearance sensor 3 being rendered a time pulse in a limiter 101. Incidentally, when the determining conditions have been established, and the damping factor of the shock absorber and the spring constant of the spring are changed over to large values, followability of the wheels to the surface condition of the road becomes inferior with the consequence that the vibrations in the vehicle body contains much more high frequency components to thereby result in increasing the changing values and the changing speed of the acceleration G and the road clearance. However, since the condition for the sustaining time is added as the determining factor, there is such an effect that the original spring constant of the suspension device with the soft spring mode can be reinstated after termination of the abrupt changes in the vehicle posture, even when the vehicle is passing over the rough road. By the way, in the above-described embodiment, the direction in the vibratory acceleration has not been designated in particular. It goes without saying, however, that the same resulting effect can also be expected according to the present invention with a suspension device capable of detecting the acceleration not only in the up-and-down direction corresponding to the variations in the road clearance, buy also in the right-and-left direction thereof. Further, passage time of the vehicle over the hollow cavity in the road surface is inversely proportionate to the vehicle speed, and the vibrations which the tires pick up from the road surface is determined by both the surface condition of the road and the vehicle speed, thus it is clear that finer and more delicate change-over operations can be realized when the abovementioned determination value of the sustaining time per se is selected to the optimum value in pursuance of each vehicle speed. Delaying the output from the road clearance sensor cannot be done by the sensor per se. In the case of the G sensor, a certain degree of resulting effect can be attained by filling lubricant oil, etc. in and around those movable parts of the sensor main body. However, the sensor itself can be more simplified in its construction, when it is processed in the control unit 1 with it being operated at a high speed. Also, when the micro-computer is used in the control unit 1 to construct a digital filter, the filtering time, i.e., a determination time for the sustaining time can be easily made variable by the vehicle speed or other inputs.

Futhermore, when the filtering time, i.e., the sustaining time is fixed, the determination circuit for the sustaining time can be constructed even with use of an analog filtering circuit. Incidentally, when the vehicle is running on the rough road at an ordinary cruising speed permitted by the traffic regulations, the determination value for the optimum filtering time, or the sustaining time should preferably be in a range of from 20 ms to 70 ms, though the value has to be deducted correspondingly when a mechanical or electriclal filter is provided to a certain extent. Moreover, for the change-over operation of the damping force, the orifice of the shock absorber is varied, and, for the change-over operation of the spring constant, the volume of the air spring chamber is varied. However, it goes without saying that the same resulting effect can be expected from other systems such as a leaf spring, etc., or from changing the characteristic property of a mounting rubber for the suspension device. Furthermore, in the foregoing explanations of the embodiment according to the present invention, the response of the acceleration has been taken as an example. Again, it goes without saying that the same resulting effect can be obtained, even if an output from the road clearance sensor is directly detected to find out the absolute value of the output, or the changing speed of its single differentiation, or the acceleration (G) of its double differentiations, or the acceleration of its triple differentiations, based on the results of which the absolute value and the sustaining time are determined in the same manner as in the above-described embodiment, and then the change-over operations of the characteristics of the suspension device may be performed. The reason for this is that, when considering the vibratory acceleration in the up-and-down direction, double differentiations of the variations in the road clearance stands for the vibratory acceleration in the up-and-down direction per se. In particular, the change in the road clearance per se to be brought about at the time of abrupt braking, sudden vehicle turning, and so on has a large changing quantity and a long sustaining time. On the contrary, the change in the road clearance of the vehicle on the rough road is basically of high frequency and of small changing quantity, so that, even when the change is large, the sustaining time period is short. Since this sustaining time period has a difference of at least five to ten times as long as that on the flat and smooth road surface, there will be no problem at all, even if the determination is performed in terms of the change in the road clearance per se.

Obviously, numerous modifications and variations of the present invention are possible in light of the above teachings. It is therefore to be understood that within the scope of the appended claims, the invention may be practiced otherwise than as specifically described herein.

We claim:

1. A suspension device for an automobile, comprising: a shock absorber provided with a damping force change-over mechanism;
sensor means including means for detecting horizontal and vertical vibration of the vehicle body; and
control device which detects a sustaining time period of an output of said sensor means exceeding a determination value, said control device outputting a change-over for changing a damping force of said shock absorber to a large value only when said sustaining time period exceeds a predetermined time period, and outputting a signal for maintaining the damping force of said shock absorber to be a large value for a predetermined time period even through the output of said sensor disappears.

2. The suspension device according to claim 1, wherein said means for detecting horizontal and vertical vibrations in the vehicle body include a vibratory acceleration detecting means.

3. The suspension device according to claim 2, wherein said vibratory acceleration sensor for detecting vibrations in the vehicle body outputs a signal only when the vibratory acceleration exceeds a predetermined value.

4. The suspension device according to claim 1, wherein said sensor means further includes a road clearance sensor for detecting road clearance of the vehicle.

5. A suspension for an automobile, comprising a shock absorber provided with a damping force change-over mechanism;
a self-suspension spring provided with a spring constant change-over mechanism;
sensor means including means for detecting horizontal and vertical vibrations of the vehicle body; and
control device which detects a sustaining time period of an output of said sensor means exceeding a determination value, said control device outputting a change-over signal to change at least one of the damping force of said shock absorber and the spring constant of said spring to be a large value only when said sustaining time period continues for a predetermined time period, and outputting a signal for maintaining said at least one of the damping force of said shock absorber and the spring constant of said spring to be the large value for a predetermined time even though the output of said sensor disappears.

* * * * *